United States Patent
Beyers et al.

(10) Patent No.: US 9,212,291 B2
(45) Date of Patent: Dec. 15, 2015

(54) USE OF MELTABLE ACRYLATE POLYMERS FOR PRODUCING CONTACT ADHESIVE LAYERS

(75) Inventors: Cornelis Petrus Beyers, Altrip (DE); Stefan Kirsch, Shanghai (CN); Ulrike Licht, Mannheim (DE)

(73) Assignee: BASF SE, Ludwigshafen (DE)

( * ) Notice: Subject to any disclaimer, the term of this patent is extended or adjusted under 35 U.S.C. 154(b) by 643 days.

(21) Appl. No.: 12/933,209

(22) PCT Filed: Mar. 30, 2009

(86) PCT No.: PCT/EP2009/053736
§ 371 (c)(1),
(2), (4) Date: Sep. 17, 2010

(87) PCT Pub. No.: WO2009/121834
PCT Pub. Date: Oct. 8, 2009

(65) Prior Publication Data
US 2011/0014404 A1 Jan. 20, 2011

(30) Foreign Application Priority Data
Mar. 31, 2008 (EP) .................................. 08153759

(51) Int. Cl.
| | | |
|---|---|---|
| *B32B 27/32* | (2006.01) | |
| *C09D 133/08* | (2006.01) | |
| *B32B 7/12* | (2006.01) | |
| *B32B 27/08* | (2006.01) | |
| *B32B 27/36* | (2006.01) | |
| *B65D 77/20* | (2006.01) | |
| *C09J 133/08* | (2006.01) | |
| *B32B 7/06* | (2006.01) | |
| *B32B 27/18* | (2006.01) | |
| *B32B 27/20* | (2006.01) | |
| *B32B 27/30* | (2006.01) | |

(52) U.S. Cl.
CPC .............. *C09D 133/08* (2013.01); *B32B 7/06* (2013.01); *B32B 7/12* (2013.01); *B32B 27/08* (2013.01); *B32B 27/18* (2013.01); *B32B 27/20* (2013.01); *B32B 27/302* (2013.01); *B32B 27/306* (2013.01); *B32B 27/308* (2013.01); *B32B 27/32* (2013.01); *B32B 27/36* (2013.01); *B65D 77/2096* (2013.01); *C09J 133/08* (2013.01); *B32B 2250/24* (2013.01); *B32B 2255/10* (2013.01); *B32B 2255/26* (2013.01); *B32B 2307/31* (2013.01); *B32B 2307/412* (2013.01); *B32B 2307/7242* (2013.01); *B32B 2307/7265* (2013.01); *B32B 2307/748* (2013.01); *B32B 2435/00* (2013.01); *B32B 2439/00* (2013.01); *B32B 2439/70* (2013.01); *Y10T 428/1352* (2015.01); *Y10T 428/273* (2015.01); *Y10T 428/31797* (2015.04); *Y10T 428/31924* (2015.04); *Y10T 428/31928* (2015.04); *Y10T 428/31935* (2015.04)

(58) Field of Classification Search
CPC ............ B32B 7/06; B32B 7/12; B32B 27/08; B32B 27/18; B32B 27/20
USPC ........................ 428/34.7, 35.6, 349, 40.1, 215
See application file for complete search history.

(56) References Cited

U.S. PATENT DOCUMENTS

| | | |
|---|---|---|
| 4,042,768 A | 8/1977 | Mueller et al. |
| 4,673,601 A | 6/1987 | Lamping et al. |
| 5,128,386 A | 7/1992 | Rehmer et al. |
| 5,202,483 A | 4/1993 | Rehmer et al. |
| 5,223,645 A | 6/1993 | Barwich et al. |
| 5,382,472 A * | 1/1995 | Yanidis et al. ................ 428/349 |
| 6,833,041 B1 | 12/2004 | Meyer-Roscher et al. |
| 7,422,782 B2 * | 9/2008 | Haedt et al. ................. 428/41.7 |
| 2003/0021930 A1* | 1/2003 | Mientus et al. .............. 428/40.1 |
| 2003/0111175 A1* | 6/2003 | Fink et al. ..................... 156/330 |
| 2006/0027316 A1 | 2/2006 | Jung et al. |
| 2006/0142408 A1* | 6/2006 | Liu et al. ........................... 522/6 |
| 2008/0206417 A1 | 8/2008 | Kirsch et al. |
| 2009/0270577 A1 | 10/2009 | Beyers et al. |
| 2009/0324945 A1 | 12/2009 | Licht et al. |
| 2010/0035001 A1 | 2/2010 | Arisandy et al. |

FOREIGN PATENT DOCUMENTS

| | | |
|---|---|---|
| BE | 1010387 | 7/1998 |
| DE | 10 2004 058 070 | 6/2006 |
| DE | 10 2005 035 979 | 2/2007 |
| EP | 0 160 975 | 11/1985 |
| EP | 0 246 848 | 11/1987 |
| EP | 0 346 734 | 12/1989 |
| EP | 0 377 199 | 7/1990 |
| EP | 0 445 641 | 9/1991 |
| EP | 0 486 897 | 5/1992 |
| EP | 1460117 | 9/2004 |
| EP | 1676785 | 7/2006 |
| WO | 90 07427 | 7/1990 |
| WO | 01 23489 | 4/2001 |
| WO | 2004 014757 | 2/2004 |
| WO | 2004 058834 | 7/2004 |
| WO | 2006 058694 | 6/2006 |
| WO | 2007 012621 | 2/2007 |

OTHER PUBLICATIONS

International Search Report issued Jun. 8, 2009 in PCT/EP09/053736 filed Mar. 30, 2009.

* cited by examiner

*Primary Examiner* — Ellen S Wood
(74) *Attorney, Agent, or Firm* — Oblon, McClelland, Maier & Neustadt, L.L.P.

(57) ABSTRACT

The present invention relates to the use of meltable acrylate polymers for producing contact adhesive layers in resealable packagings. Moreover, the invention relates to multiple-layer films which have a contact adhesive layer on the basis of meltable acrylate polymers, to a method for producing said multiple-layer films, and to the use of said multiple-layer films for producing resealable packagings.

19 Claims, No Drawings

USE OF MELTABLE ACRYLATE POLYMERS FOR PRODUCING CONTACT ADHESIVE LAYERS

The present invention relates to the use of meltable acrylate polymers for producing layers of pressure-sensitive adhesive in reclosable packs. The invention further relates to multilayer films which have a layer of pressure-sensitive adhesive based on meltable acrylate polymers, to a method of producing these multilayer films, and to the use of these multilayer films to produce reclosable packs.

Reclosable packs with a closure mechanism based on pressure-sensitive adhesives (PSAs) have been known for some time, as for example from EP-A 160975, EP-A 1460117, EP-A 1676785, BE 1010387, WO 90/07427, WO 2004/014757, and WO 2007/012621.

Reclosable packs generally feature a container (tray), which contains the packaged contents, and a closure film, commonly alternatively lid film, which is connected to the container via a seal; that is, the container and the closure film are durably connected to one another via a seal layer. When the pack is opened for the first time, a permanently tacky layer of adhesive (PSA layer) disposed between the seal and the container or between the seal and the closure film is exposed, through the tearing-open of the seal layer in the regions of the seal seams, for example. The permanently tacky layer of adhesive ensures repeatable opening and closing of the pack.

With reclosable packs, the PSA layer is typically integrated into a film material. This film material, on a filmlike backing (backing film), carries a PSA layer, which in turn is covered by a sealable layer. Between the actual backing and the PSA layer, but also between the sealable layer and the PSA layer, there may be barrier layers. This film material may form not only the container but also the lid film.

The PSA layer is subject to a series of requirements. First, the adhesive action, even after repeated opening and closing, ought to be sufficiently great to ensure effective reclosability. Second, the maximum forces which arise during opening ought not to be too high, in order to ensure that opening is even and as far as possible not jerky, not least since, otherwise, there is a risk of the closure film tearing. Furthermore, the PSA layer ought as far as possible to be low in odor. Moreover, the PSA ought to be easy to incorporate into the desired closure system.

The PSAs used in the prior art to produce reclosable packs are often unable or only partly able to fulfil these requirements. More particularly, with many PSAs, as in the case, for example, of those based on styrene-butadiene block copolymers or styrene-isoprene block copolymers, it is necessary to provide a barrier layer between the seal layer and the PSA layer in order to prevent contact of migratable constituents of the adhesive layer, such as plasticizers and tackifiers, with the packaged contents. This increases the complexity and hence also costs of producing the pack. In many cases, again, the adhesive effect goes down considerably after opening and closing have been carried out a number of times, with the consequence that an effective closure is no longer ensured. Moreover, absence of odor is desired, but is not achieved, more particularly when using PSAs using vinyl acetate and when using adhesives based on the block copolymers identified above.

An object of the invention, therefore, was to provide odorless PSAs for reclosable packs that meet the criteria identified above and resolve the disadvantages that occur with the PSAs used typically for this purpose.

It has now been found that these and further objects are achieved by the acrylate polymers described in more detail below.

The present invention accordingly provides the use of acrylate polymers having a glass transition temperature<−20° C., determined according to ASTM-D 3418/82, comprising 1 to 30 mmol of copolymerized photoinitiator per kg of acrylate polymer and comprising in copolymerized form at least 80% by weight, based on the total weight of the acrylate polymer, of $C_3$-$C_{20}$ alkyl acrylates, to produce layers of pressure-sensitive adhesive in a reclosable packs.

The invention features a series of advantages. For instance, the acrylate polymers used in accordance with the invention allow the production of odorless reclosable packs, suitable more particularly for comestibles, without the need for a barrier layer between the PSA layer and the seal layer. The acrylate polymers are odorless and hence allow the production of low-odor packs. They ensure good service properties, i.e., effective reclosability after multiple use, and even opening without great expenditure of force.

Effective reclosability after multiple use is ensured when the bond strength is sufficient for reliable closure even after 10-fold opening/closing. Generally speaking, this is the case for a bond strength, determined according to Finat # 1 (180° angle, constant peel speed 300 mm/min), of at least 0.5 N/10 mm. Even opening is ensured, generally speaking, when the maximum force on opening, determined according to Finat # 1 (180° angle, constant peel speed 300 mm/min), does not exceed 15 N/10 mm, more particularly 10 N/mm, and especially 8 N/mm.

The acrylate polymers used in accordance with the invention are known from the prior art, for example from EP-A 246848, EP-A 445641, WO 01/23489, WO 2004/058834 and WC) 2006/058694.

The acrylate polymers used in accordance with the invention comprise in copolymerized form at least 80%, more particularly at least 85%, and especially at least 90%, by weight, based on the total weight of the acrylate polymer, of $C_3$-$C_{20}$ alkyl acrylates. These monomers are referred to below as monomers A.

The alkyl radical in the $C_3$-$C_{20}$ alkyl acrylates is preferably attached via a primary or secondary C atom to the oxygen atom of the acryloyloxy group and has more particularly 3 to 12 C atoms and especially 4 to 10 C atoms. Also suitable are mixtures of $C_3$-$C_{20}$ alkyl acrylates wherein the alkyl radicals have the same or a different number of C atoms, the average of the C atoms lying preferably in the range from 3 to 12 and more particularly in the range from 4 to 10 (molar average). Examples of preferred $C_3$-$C_{20}$ alkyl acrylates are propyl acrylate, isopropyl acrylate, n-butyl acrylate, isobutyl acrylate, 2-butyl acrylate, n-pentyl acrylate, 2-pentyl acrylate, isopentyl acrylate, 2-methylpentyl acrylate, n-hexyl acrylate, 2-hexyl acrylate, 2-methylhexyl acrylate, 2-ethylhexyl acrylate, n-heptyl acrylate, 2-heptyl acrylate, 2-methylheptyl acrylate, 2-propylheptyl acrylate, n-octyl acrylate, isooctyl acrylate, n-nonyl acrylate, isononyl acrylate, n-decyl acrylate, and isodecyl acrylate, and also mixtures of these monomers. With particular preference the $C_3$-$C_{20}$ alkyl acrylate is selected from n-butyl acrylate, isobutyl acrylate, 2-butyl acrylate, n-hexyl acrylate, 2-hexyl acrylate, 2-ethylhexyl acrylate, 2-propylheptyl acrylate, and mixtures thereof.

Besides the aforementioned $C_3$-$C_{20}$ alkyl acrylates and the photoinitiators, the acrylate copolymers may comprise further monoethylenically unsaturated monomers in copolymerized form. Their fraction, based on the total weight of the acrylate copolymer, will not exceed 20% by weight, preferably 15% by weight, and is situated frequently in the range from 1% to 20% by weight and more particularly in the range from 5% to 15% by weight, based on the total amount of the monomers forming the acrylate polymer.

These include, on the one hand, $C_1$-$C_{12}$ alkyl methacrylates such as methyl methacrylate, ethyl methacrylate, propyl methacrylate, isopropyl methacrylate, n-butyl methacrylate, and tert-butyl methacrylate, and also acrylonitrile, methacrylonitrile, methyl acrylate, and ethyl acrylate. These monomers are referred to below as monomers B. Preferred monomers B are $C_1$-$C_4$ alkyl methacrylates, methyl acrylate, and ethyl acrylate, more particularly methyl acrylate and methyl methacrylate. Their fraction, based on the total weight of the acrylate polymer, will not exceed 20% by weight, preferably 15% by weight, and is situated frequently in the range from 1% to 20% by weight and more particularly in the range from 5% to 15% by weight, based on the total amount of the monomers forming the acrylate polymer.

These include, furthermore, monoethylenically unsaturated, nonaromatic monomers C which are different from the aforementioned monomers A and B. They include, more particularly, those monomers having an increased water solubility of generally at least 80 g/l at 25° C. and 1013 mbar. Their fraction, based on the total weight of the acrylate polymer, will preferably not exceed 10% by weight and is situated frequently in the range from 0.1% to 10% by weight and more particularly in the range from 0.5% to 8% by weight, based on the total amount of the monomers forming the acrylate polymer.

Monomers C contemplated include more particularly acidic monomers having at least one carboxylic, sulfonic or phosphonic acid group. Preferred among these are monomers with carboxylic acid groups. Preferred among these are monoethylenically unsaturated $C_3$-$C_8$ monocarboxylic acids such as acrylic acid and methacrylic acid, monoethylenically unsaturated $C_4$-$C_8$ dicarboxylic acids such as itaconic acid, maleic acid or fumaric acid, mono-$C_1$-$C_{20}$ alkyl esters, more particularly $C_1$-$C_6$ alkyl esters of monoethylenically unsaturated $C_4$-$C_8$ dicarboxylic acids, such as monomethyl maleate, monobutyl maleate, and monomethyl fumarate.

Monomers C contemplated include more particularly neutral monomers with increased water solubility. These include the amides of monoethylenically unsaturated $C_3$-$C_8$ monocarboxylic acids, such as acrylamide and methacrylamide, and also hydroxyalkyl esters of monoethylenically unsaturated $C_3$-$C_8$ monocarboxylic acids, such as hydroxyethyl acrylate, hydroxyethyl methacrylate, hydroxypropyl acrylate, and hydroxypropyl methacrylate.

The acrylate polymers used in accordance with the invention further comprise in copolymerized form at least one photoinitiator. Acrylate polymers of this kind are crosslinkable with UV light. As a result of irradiation with high-energy light, more particularly UV light, the photoinitiator brings about crosslinking of the acrylate polymers, preferably through a chemical grafting reaction of the photoinitiator with a spatially adjacent polymer chain.

The photoinitiator is preferably selected such that an irradiation with UV light does not give off any constituents of low molecular mass. Preferably it is an H-abstractor. More particularly the photoinitiator is a photoinitiator of Norrish type 2. More particularly the photoinitiator is selected such that crosslinking takes place by insertion of a carbonyl group of the photoinitiator into an adjacent C—H bond to form a —C—C—O—H moiety.

Preferably the photoinitiator is selected such that it can be activated on irradiation of UV light in the wavelength range from 220 to 350 nm, more particularly in the range from 250 to 300 nm. In other words, the photoinitiator is preferably selected such that its principal absorption band lies in the range from 220 to 350 nm, more particularly in the range from 250 to 300 nm.

In accordance with the invention the acrylate copolymers comprise in copolymerized form 1 to 30 mmol, more particularly 2 to 20 mmol, and especially 5 to 15 mmol of photoinitiator per kg of acrylate polymer.

Preferred copolymerizable photoinitiators are acetophenone and benzophenone derivatives which comprise at least one, preferably one, ethylenically unsaturated group. The ethylenically unsaturated group is preferably an acryloyl or methacrylic group.

The ethylenically unsaturated group may be attached directly to the phenyl ring of the acetophenone or benzophenone derivative. Generally speaking, located between phenyl ring and ethylenically unsaturated group there is a spacer group. The spacer group may comprise, for example, up to 30 C atoms.

Suitable acetophenone or benzophenone derivatives are described for example in EP-A 346734, EP-A 377199 and EP-A 486897, hereby incorporated by reference. Preferred acetophenone and benzophenone derivatives are those of the formula I

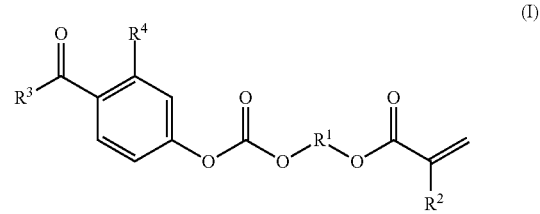

in which $R^1$ is a divalent organic radical having at least 2 and up to 30 C atoms, $R^2$ is an H atom or a $C_1$-$C_4$ alkyl group, and $R^3$ is an optionally substituted phenyl group or a $C_1$-$C_4$ alkyl group, and $R^4$ is hydrogen, or $R^3$ together with $R^4$ forms a $C_2$-$C_4$ alkylene group, in which a $CH_2$ group not adjacent to the carbonyl group may have been replaced by oxygen.

Optionally substituted means that the phenyl group may have 1, 2, 3 or 4 substituents selected from halogen, $C_1$-$C_4$ alkyl, and $C_1$-$C_4$ alkoxy. $C_1$-$C_4$ alkyl is a saturated hydrocarbon radical having 1 to 4 C atoms such as methyl, ethyl, n-propyl, 2-propyl, n-butyl, 2-butyl, and 2-methylpropyl.

A divalent organic radical is an aromatic, aliphatic or cycloaliphatic organic radical of 2 to 30 carbon atoms and is composed preferably of 2 to 30 carbon atoms, 0 to 4 oxygen atoms, and hydrogen atoms. Preferably it is an aliphatic or cycloaliphatic organic radical and more particularly an alkylene radical.

Alkylene is a divalent saturated hydrocarbon radical which is linear or branched and has generally 2 to 30, preferably 2 to 10, and more particularly 2 to 8 C atoms. Examples of alkylene are 1,2-ethanediyl, 1,2-propanediyl, 1,3-propanediyl, 1,4-butanediyl, 1,5-pentanediyl, 1,6-hexanediyl, 1,7-heptanediyl, 2-methyl-1,4-butanediyl, and 1,8-octanediyl.

$R^1$ is more preferably an alkylene group having 2 to 30 and preferably 2 to 10 C atoms, more particularly a $C_2$-$C_8$ alkylene group. $R^2$ is more particularly hydrogen or methyl. $R^3$ is more preferably a methyl group or a phenyl group.

Preferably the acrylate polymers, apart from the photoinitiators, comprise in copolymerized form substantially no aromatic monomers, i.e., less than 1% by weight, more particularly less than 0.1% by weight, based on the acrylate polymer, of aromatic monomers.

Preferably the acrylate polymer used in accordance with the invention to produce the PSA layer, i.e., the acrylate polymer prior to UV radiation, is substantially non-crosslinked. Accordingly the acrylate polymers comprise in copolymerized form preferably substantially no polyethylenically unsaturated monomers, i.e., less than 1% by weight, more particularly less than 0.1% by weight, based on the acrylate polymer, of polyethylenically unsaturated monomers.

Preferably the acrylate polymers comprise in copolymerized form substantially no monomers that are different from the monomers A, B, and C and the photoinitiator, i.e., less than 1% by weight, more particularly less than 0.1°)/0 by weight, based on the acrylate polymer, of such monomers. In other words, the acrylate polymer is composed to an extent of at least 99% by weight, more particularly of at least 99.9% by weight, of the monomers A, B, and C and the photoinitiator.

More particularly the acrylate polymer is composed of monoethylenically unsaturated monomers M and the photoinitiator, the monomers M comprising:
a) at least 80%, e.g., 80% to 99%, more particularly 85% to 95%, by weight of at least one monomer A as defined above, which is selected more particularly from $C_4$-$C_{10}$ alkyl acrylates in which the alkyl radical is attached via a primary or secondary C atom to the oxygen atom of the acryloyloxy group;
b) up to 20%, e.g., 1% to 20%, more particularly 5% to 15%, by weight of at least one monomer B selected from $C_1$-$C_4$ alkylmethacrylates, methyl acrylate, and ethyl acrylate, more particularly from methyl methacrylate and methyl acrylate;
c) up to 10%, more particularly 0% to 8% or 0.1% to 8%, by weight of one or more nonaromatic, monoethylenically unsaturated monomers C, selected preferably from monoethylenically unsaturated $C_3$-$C_8$ monocarboxylic acids, amides of monoethylenically unsaturated $C_3$-$C_8$ monocarboxylic acids, monoethylenically unsaturated $C_4$-$C_8$ dicarboxylic acids, the mono-$C_1$-$C_{20}$ alkyl esters of monoethylenically unsaturated $C_4$-$C_8$ dicarboxylic acids, and the hydroxyalkyl esters of monoethylenically unsaturated $C_3$-$C_8$ monocarboxylic acids, and especially from acrylic acid and methacrylic acid and also the hydroxyalkyl esters of acrylic acid and methacrylic acid;

the weight fractions of monomers A, B and C adding up to 100% by weight.

Preferably the acrylate polymers are highly mobile at an elevated temperature of, for example, 130° C.; that is, they can be heated to this temperature or above without decomposition and then have a low viscosity. Preferably the acrylate polymers can be heated to a temperature of up to 250° C. or above without decomposition. The zero-shear viscosity of the acrylate polymers at 130° C. is situated more particularly in the range from 10 to 200 P·s. Preferred acrylate polymers have at 130° C. a zero-shear viscosity in the range from 20 to 150 P·s. The zero-shear viscosities can be determined by oscillatory rheometry, the data being evaluated in accordance with the Carreau-Gahleitner model.

The acrylate polymer preferably has a K value of 20 to 90, more preferably of 30 to 80, and more particularly of 40 to 70, measured in tetrahydrofuran (1% strength by weight solution, 21° C.). The Fikentscher K value (Fikentscher Cellulosechemie 1932, 13, 58-64 and 71-74) is determined via the viscosity of polymer solutions and is a measure of the molecular weight of the polymer.

The number-average molecular weight of the acrylate polymers used in accordance with the invention is situated typically in the range from 5000 to 100 000 daltons, more particularly in the range from 10 000 to 50 000 daltons. The weight-average molecular weight of the polymers used in accordance with the invention is situated typically in the range from 20 000 to 1 000 000 daltons, more particularly in the range from 50 000 to 500 000 daltons. The molecular weights specified here are those as determined by means of gel permeation chromatography (GPC) by standard methods.

The glass transition temperature (Tg) of the acrylate polymers used in accordance with the invention is preferably −60 to −20° C., more particularly −55 to −25° C., and more preferably from −50 to −30° C. The glass transition temperature of the polymer A can be determined by typical methods such as differential thermoanalysis or differential scanning calorimetry (see, e.g., ASTM 3418/82, midpoint temperature). The glass transition temperature can be determined by the skilled worker through selection of suitable monomers or monomer combinations and calculated via the equation of Fox, based on the known glass transition temperatures of homopolymers of the monomers of which the acrylate polymer is composed.

The acrylate polymers are typically prepared by copolymerization of the monomeric components (constituent monomers, i.e., $C_3$-$C_{20}$ alkyl acrylates, photoinitiator, and, if appropriate, further monomers B and C) under the conditions of a free-radical addition polymerization. For this purpose the monomers are polymerized, using the typical polymerization initiators and also, optionally, regulators, and at the typical temperatures, in bulk or in solution.

Preferably the polymers are obtained by polymerization of the monomers in solvents (solution polymerization), more particularly in solvents with a boiling range of 50 to 150° C., preferably of 60 to 120° C. The solution polymerization takes place with use of the typical amounts of polymerization initiators, which is generally 0.01% to 10% by weight, more particularly 0.1% to 4% by weight, based on the total weight of the monomers.

The polymerization of the acrylate polymer's constituent monomers may be carried out in one or more stages, by batch or feed techniques. The actual polymerization of the monomeric components is preferably followed by a postpolymerization procedure for the purpose of reducing the residual monomer content.

Solvents which can be used include more particularly alcohols, such as methanol, ethanol, n-propanol, isopropanol, n-butanol, and isobutanol, preferably isopropanol and/or isobutanol, hydrocarbons such as toluene and more particularly benzines with a boiling range of 60 to 120° C., ketones such as acetone, methyl ethyl ketone, methyl isobutyl ketone, $C_1$-$C_6$ alkyl esters of aliphatic $C_1$-$C_4$ monocarboxylic and $C_2$-$C_6$ dicarboxylic acids, more particularly ethyl acetate, and also mixtures of solvents of the stated type.

Polymerization initiators contemplated for solution polymerization include, for example, azo compounds, peroxides, and hydroperoxides, such as ketone peroxides, acyl peroxides, peroxoalkyl esters of aliphatic carboxylic acids, alkyl peroxides, and alkyl hydroperoxides.

After the polymerization in solution, the solvents may optionally be separated off under reduced pressure, operating at elevated temperatures, in the range from 100 to 150° C., for example. The polymers can then be used in solvent-free state, i.e., in the form of melts. In certain cases it is also of advantage to prepare the polymers by polymerization in bulk, i.e., without the accompanying use of a solvent, in which case it is possible to operate batchwise or else continuously, in accordance, for example, with the specifications of U.S. Pat. No. 4,042,768.

The acrylate polymers used in accordance with the invention are preferably substantially solvent-free and are used preferably in substantially solvent-free form.

Substantially solvent-free means that the residual level of solvents, e.g., organic solvents and/or water, is below 1 part by weight, more particularly below 0.5 part by weight, more preferably below 0.2 part by weight, very preferably below 0.1 part by weight, or below 0.08 part by weight, based on 100 parts by weight of acrylate polymer, or based on 100 parts by weight of the adhesive composition used. Preferably the total fraction of volatile organic constituents (VOC content, determined by means of gas chromatography according to DIN ISO 11890-2) is below 2000 ppm, especially below 1000 ppm or below 800 ppm (parts by weight). Volatile compounds are those which have a boiling point below 250° C. under atmospheric pressure.

The acrylate polymers are suitable for producing permanently tacky coatings, i.e., as pressure-sensitive adhesives (PSAs), for producing reclosable packs. For this purpose the acrylate polymers are used as they are or in the form of an adhesive composition together with adhesive additives such as fillers, dyes, tackifiers (tackifying resins) or flow control agents. The use of flow control agents, fillers, and tackifiers, however, is not necessary. In one preferred embodiment, therefore, the acrylate polymers are used substantially without tackifiers for the purpose of producing the PSA layer. Likewise preferredly the acrylate polymers are used without flow control agents. Likewise preferredly the acrylate polymers are used substantially without fillers.

In one particularly preferred embodiment the acrylate polymers of the invention are used as they are, i.e., substantially free of further constituents. "Substantially free" or "substantially" without means that the fraction of the component in question accounts for less than 1% by weight, more particularly less than 0.5% or 0.1% by weight, based on the acrylate polymer.

As already elucidated at the outset, the reclosable packs typically have at least one packaging element with a PSA layer. This packaging element typically takes the form of a multilayer film, also referred to below as a laminate or film laminate. These multilayer films comprise:
a) a backing film,
b) a PSA layer, and
c) a sealable layer,
the PSA layer being disposed between the backing film and the sealable layer.

The PSA layer is disposed on the backing. Between backing and PSA layer there may also be further layers, examples being migration barriers for gases or water, or adhesion promoters. In one preferred embodiment there is no need for such further layers, and the PSA layer is located directly on the backing. Corresponding layers may also be applied, for example, on the reverse of the backing.

Between PSA layer and sealable layer there may likewise be one or more further layers, examples being layers which form a barrier to unwanted gases (oxygen, water vapor), ensure UV protection, act as oxygen scavengers or migration barriers, or serve as adhesion promoters. In one preferred embodiment there is no need for such further layers, and the sealable layer may be applied directly on the PSA layer.

In accordance with the invention the PSA layer comprises at least one acrylate polymer as defined above. This layer is crosslinked by UV radiation in order to set its adhesive properties. Multilayer films of this kind are new and likewise provided by the present invention. More particularly the PSA layer is composed of the acrylate polymer which has been crosslinked by UV radiation.

Preferred PSA layers are those obtainable by irradiation with UV light in the wavelength range from 220 to 350 nm, more particularly in the range from 250 to 300 nm.

Preferred PSA layers are those obtainable by irradiation with UV light with a radiation dose of 0.5 to 20 mJ/cm$^2$, more particularly 1 to 15 mJ/cm$^2$, and especially 1.5 to 10 mJ/cm$^2$.

The thickness of the PSA layer is generally 1 to 50 µm, more particularly 2 to 40 µm, and especially 5 to 30 µm. This corresponds to an average coating thickness of 1 to 50 g/m$^2$, more particularly 2 to 40 g/m$^2$, and especially 5 to 30 g/m$^2$ of PSA or acrylate polymer.

The backing is generally a polymer film, which may optionally form an assembly with other materials, as for example with metal (e.g., metallized polymer films) or with paper.

Contemplated more particularly are polymer films, preferably transparent polymer films or assemblies thereof with other materials, more particularly metallized polymer films. Examples of polymer films are polyolefin films, polyester films or polyacetate films, for example. Also suitable are coextrudates of different polymers, examples being polyester/polyacetate films.

Examples of polyolefin films contemplated are those of polyethylene, polypropylene, more particularly oriented polypropylene. Preference is given to polyester films, examples being those of polyalkylene phthalate or terephthalate, with particular preference being given to films of polyethylene terephthalate (PET), which may be crystalline (c-PET) or amorphous (a-PET).

In one preferred embodiment of the present invention the backing film is a transparent polymer film, preferably a transparent polyolefin, polyester or polyacetate film, more particularly a transparent polyolefin film, and especially a transparent polyethylene or polypropylene film. Transparent in the sense of the invention means that the film is unprinted, is not laminated with a nontranslucent material such as paper, a printed film or metal foil, and is substantially uncolored. Substantially uncolored means that the polymer film contains less than 0.1%, more particularly less than 0.05%, and especially less than 0.01%, by weight, based on the mass of the polymer film, of coloring constituents such as dyes or pigments.

The thickness of the backing is preferably 5 to 500 µm, more preferably 10 to 300 µm, more particularly 15 to 250 µm. In the case of a lid film, the thickness of the backing will be situated typically in the range from 5 to 100 µm. Where the film material forms the container, the thickness of the backing will typically be situated in the range from 50 to 500 µm.

The backing may, for example, also be printed or laminated with a printed film.

The backing may also be pretreated with a primer. Generally speaking, however, there is no need for a primer.

In the multilayer films of the invention there is a sealable layer disposed on the PSA layer. "Sealable" means that, at an elevated temperature, preferably 30 to 200° C., more preferably 70 to 120° C., and an elevated pressure, preferably at a pressure of 1 to 20 bar, more preferably from 1 to 5 bar, this layer can be joined to a further substrate. In general a join (seal) of this kind is performed with an increase in pressure and/or temperature, after the packaged contents have been introduced.

Suitable sealable layers are all polymers and polymer systems which are sealable—that is, the seal layer formed can be welded, i.e., durably bonded, to another layer at sufficient pressures and temperatures. This other layer may be composed of the same polymer or of another polymer. "Durably bonded" means that the bond cannot be parted without destruction.

The sealable layer is formed preferably of polymers which are blocking-resistant at room temperature (21° C., 1 bar), i.e., the polymer film formed is not tacky. With particular preference the polymer is blocking-resistant to +50° C.

The sealable layer c) is composed preferably of a polymer which is composed to an extent of at least 20% by weight, more particularly at least 40% by weight, more preferably at least 60% by weight with more particular preference at least 80% by weight and especially at least 90% by weight or at least 95% by weight or at least 99% by weight of at least one $C_2$-$C_6$ olefin. Polymers of this kind are referred to below as polyolefins for short. $C_2$-$C_6$ olefins include, more particularly, ethylene or propylene.

Preferred polymers for the sealable layer are homopolymers of the olefins, more particularly polyethylene, or polypropylene, or their copolymers.

With particular preference the sealable layer is composed of a polymer which is composed of more than 60% by weight of ethylene. With more particular preference the sealable layer is composed of polyethylene (PE).

For the sealable layer it is possible to use low molecular mass homopolymers or copolymers of the aforementioned olefins, examples being PE waxes of the kind described in WO 2007/012621. Also suitable are polymers of high molecular mass, e.g. polyethylene (PE), which can be processed thermoplastically and can be extruded, for example, in the form of films.

Polyolefins are more particularly sealable with themselves; that is, the other layer, to which a durable bond is to be produced, is made preferably from the same material.

The sealable layer c) may also be composed of polymers which are composed of the abovementioned monomers of the adhesive polymer; however, the polymer obtained must be blocking-resistant, and hence is not a PSA. Suitability is possessed more particularly by polymers which comprise in copolymerized form the above-identified acrylic esters or methacrylic esters ((meth)acrylic monomers below) and/or vinylaromatic monomers and/or mixtures of such monomers. Suitable polymers are composed for example of more than 60% by weight of (meth)acrylic monomers and vinylaromatic monomers. Known under the tradename Johncryl® are aqueous polymer solutions of such polyacrylates, or copolymers of acrylates and styrene, which can be used for the sealable layer. The above polymers are suitable more particularly for sealing with layers of other polymers, more particularly layers of polyesters, e.g., PET, polystyrene or polyvinyl chloride.

The thickness of the suitable layer is generally 5 to 100 μm, more particularly 10 to 80 μm, and especially 15 to 50 μm.

The production of the multilayer films of the invention may take place in analogy to known methods of producing multilayer films, the method including irradiation of the acrylate polymer applied as coating.

Generally speaking, a method of this kind comprises the following steps:
i. applying an acrylate polymer as here described as a coating to the backing film,
ii. irradiating the coating with UV radiation, and
iii. applying the sealable layer to the coating obtained in step i or ii, i.e. the sealable layer is applied before or after the irradiation in step ii.

Application of the acrylate polymer to the backing film may take place in conventional manner, the acrylate polymer typically being applied in liquid form. By way of example the acrylate polymer can be applied to the backing from a solution of the acrylate polymer in one of the aforementioned organic solvents and the resulting coating can be dried.

Preferably the acrylate polymer is applied in solvent-free form at elevated temperature as a "melt" to the backing. The application of the melt of the acrylate polymer takes place preferably at a temperature in the range from 80 to 250° C., more particularly at a temperature in the range from 100 to 180° C. The melt of the acrylate polymer preferably has a zero-shear viscosity in the range from 10 to 200 P·s, more particularly in the range from 20 to 150 Pa·s.

The acrylate polymer can be applied as a formulation with PSA additives to the backing. Preferably it is applied as it is, i.e., substantially free from PSA additives, to the backing.

The amount of acrylate polymer on application is generally selected so as to result in a coating thickness of 1 to 50 g/m$^2$, more particularly 2 to 40 g/m$^2$, and especially 5 to 30 g/m$^2$ of PSA or acrylate polymer.

The coating obtained on application is irradiated with UV radiation, optionally after a drying step for the purpose of removing solvent, in order to achieve crosslinking of the acrylate polymer. Preferably there is irradiation with UV light in the wavelength range from 220 to 350 nm, more particularly in the range from 250 to 300 nm. Preference is given to selecting a radiation dose in the range from 0.5 to 20 mJ/cm$^2$, more particularly 1 to 15 mJ/cm$^2$, and especially 1.5 to 10 mJ/cm$^2$ or 1.5 to 8 mJ/cm$^2$.

The coating may be irradiated directly or indirectly. In the case of direct irradiation, the coated side is irradiated before the sealable layer is applied, i.e., the side of the backing film that is coated with the acrylate polymer faces in the direction of the radiation source. In the case of indirect irradiation, the irradiation is either through the backing film, i.e., noncoated side of the backing film faces in the direction of the radiation source, or through the sealable layer.

Preference is given to indirect irradiation through the sealable layer, especially when the sealable layer is a polyolefin layer as defined above, and with particular preference when the sealable layer is constructed from a polymer with an ethylene content of more than 60%, more particularly at least 80%, more preferably at least 90% or at least 95% or at least 99%, by weight. With particular preference the sealable layer consists of polyethylene (PE).

Indirect irradiation through the backing film is suitable, of course, when the backing film is transparent, especially when it is a transparent polymer film, for example a transparent polyolefin, polyester or polyacetate film, more particularly a transparent polyolefin film, and especially a transparent polyethylene or polypropylene film.

A sealable layer is applied directly (or, optionally, after application of a barrier layer) to the resulting PSA layer. The sealable layer may also be applied to the noncrosslinked coating, and then irradiation with UV light carried out, which is preferred according to the invention.

The sealable layer may be laminated as a polymer film onto the PSA layer. Alternatively the seal layer c) may be produced from polymer solutions or polymer dispersions, in which case polymer solutions or polymer dispersions in water are preferred. Then, by filming and removal of the water from the polymer solutions or polymer dispersions, the sealable layer is formed.

Application of the sealable layer takes place preferably by application of a film of the polymer which forms the sealable layer. The application of the film takes place by typical techniques of lamination, typically at temperatures below the sealing temperature, e.g., at temperatures in the range from 20 to 70° C. The pressure is situated typically in the range from 1 to 20 N/cm².

The multilayer films of the invention are especially suitable for producing reclosable packs. Accordingly the present invention provides reclosable packs which comprise at least one of the multilayer films described here.

The reclosable packs used in accordance with the invention generally have at least two packaging elements joined to one another via a seal layer, with one of the packaging elements being a multilayer film of the invention. In general, one packaging element is a container which is intended and designed to accommodate the packaged contents, and the further packaging element is a filmlike closure (closure film) for the container.

Where the multilayer film of the invention is used as a closure film, the further packaging element is the container; where the multilayer film of the invention is used as a container, the further packaging element is the closure film.

More particularly the further packaging element, at least at the points at which a bond is to take place with the multilayer film of the invention, i.e., at the seal seam, has an external coating of material which is sealable with the sealable layer c) of the multilayer film, or is composed of such a material (see remarks above regarding the sealable layer).

In one preferred embodiment the multilayer film forms a closure film for a container. The container may in this case be composed of any desired materials, as for example of glass, paper, metal or plastic, or of composite materials, and its form is arbitrary. According to one preferred embodiment the container is of plastic, more particularly of a polyester, PET for example, and the container is coated with a sealable layer, polyethylene for example, at the sites to be sealed with the closure film, more particularly on the rim. The container preferably takes the form of a tray or beaker and has a bearing surface for the closure film in the regions that are to be sealed.

According to one preferred embodiment, the container is a plastic container made from a plastic film material, such as, for example, a container made from a plastic film coated with polyethylene or another seal material, such as, for example, a polyester film coated with polyethylene or another seal material. Containers of this kind are generally produced by thermoforming of a corresponding film. The thickness of the container material is then typically in the range from 30 to 500 μm, without seal layer, or in the range from 50 to 500 μm with seal layer.

In another preferred embodiment the multilayer film forms the container. Preferably the container takes the form of a tray or beaker and has a bearing surface for the closure film in the regions that are to be sealed. According to one preferred design the container is a plastic container made of a multilayer film of the invention in which the backing is a polyester film, more particularly a PET film, which is furnished with a PSA layer of the invention and with a sealable layer, more particularly a polyethylene layer. Containers of this kind are generally produced by thermoforming a corresponding film. The thickness of the container material is then typically in the range from 30 to 500 μm, without seal layer, or in the range from 50 to 500 μm with seal layer. The closure film may then be composed of any desired materials, as for example of paper, metal or plastic, or of composite materials. According to one preferred embodiment the closure film is of plastic, more particularly of a polyester, PET for example, the closure film being coated with a sealable layer, polyethylene for example.

The first closing of the reclosable pack, i.e., the sealing or press-assembly of the two packaging elements, takes place preferably at a pressure of 1 to 20 bar, more preferably at 1 to 5 bar. The temperature is preferably 70 to 250° C., more preferably 100 to 200° C.; the duration is more particularly 0.5 to 5 seconds, more particularly 1 to 2 seconds.

The packs of the invention are suitable for accommodating any desired contents. With particular advantage they are suitable for the packaging of comestibles, examples being meat products, sausage products or cheese products.

The packs produced using the multilayer films of the invention are reclosable. When the pack is opened for the first time, it is not the seal seam that tears, but rather the weaker PSA layer, and so after that at least one of the contact faces of the two separated packaging elements has a PSA layer in the contact region. If, when the pack is being torn open, there is cohesive fracture into the PSA layer, both faces are tacky. The pack can be reclosed a great number of times, with virtually no drop in the strength after repeated closing. The maximum force at 2nd and further opening, however, is comparatively low, thereby simplifying the operability.

The examples which follow serve to illustrate the invention and should not be interpreted as imposing any restriction.

PREPARATION EXAMPLES

The K value was determined by determination of a 1% strength by weight solution of the acrylate polymer in tetrahydrofuran (at 21° C.).

The zero-shear viscosities reported relate to the zero-shear viscosities of the pure acrylate polymers and were measured at 130° C. using a Paar Physica MCR100 rheometer, with evaluation using the Carreau-Gahleitner model.

The photoinitiator used was 4-(4-(benzoyl)phenoxycarbonyloxy)butyl acrylate (compound of the formula I with $R^1$=butane-1,4-diyl, $R^2$=H, and $R^3$=phenyl).

Example 1

A polymerization apparatus consisting of glass reactor, feed vessels, reflux condenser, stirrer, and nitrogen inlet was charged with 94.6 g of isobutanol under a gentle stream of nitrogen, and this initial charge was heated to 95° C. Added to it were 60.6 g of monomer mixture and 7.1 g of initiator solution, and polymerization was carried out at this temperature for 10 minutes. Then 1150.6 g of monomer mixture were added over the course of 3 hours and 64.4 g of initiator solution over the course of 3 hours 15 minutes. Subsequently a solution of 2.4 g of tert-butyl peroctoate in 36.2 g of isobutanol was added over the course of 5 minutes, the temperature was raised to 120° C., and polymerization was continued for 60 minutes. The solvent was distilled off under reduced pressure, during which the temperature was raised to 135° C. At the end, under the best reduced pressure, degassing was carried out at 135° C. for an additional 1 hour and the polymer was aerated and discharged.

Solids content: 99.8%; K value: 52.1; zero-shear viscosity at 130° C.: 72.1 Pa·s Monomer mixture: 88% by weight ethylhexyl acrylate, 9% by weight methyl methacrylate, 2.5% by weight acrylic acid, 0.5% by weight photoinitiator Initiator solution: 1.09 g tert-butyl peroctoate and 70.5 g isobutanol

Example 2

A polymerization apparatus consisting of glass reactor, feed vessels, reflux condenser, stirrer, and nitrogen inlet was charged with 283 g of methyl ethyl ketone (MEK) under a gentle stream of nitrogen, and this initial charge was heated to 80° C. Added to it were 60.6 g of monomer mixture and 6.06 g of initiator solution, and polymerization was carried out at this temperature for 10 minutes. Then 1150.6 g of monomer mixture were added over the course of 3 hours and 54.6 g of initiator solution over the course of 3 hours 15 minutes. Subsequently a solution of 3.2 g of tert-butyl perpivalate (75% strength in mineral oil) in 37.3 g of MEK was added over the course of 5 minutes, the temperature was raised to 85° C., and polymerization was continued for 60 minutes. The solvent was distilled off under reduced pressure, during which the temperature was raised to 135° C. At the end, under the best reduced pressure, degassing was carried out at 135° C. for an additional 1 hour and the polymer was aerated and discharged.

Solids content: 100%; K value: 51.8; zero-shear viscosity at 130° C.: 66.9 Pa·s

Monomer mixture: 88% by weight ethylhexyl acrylate, 9% by weight methyl methacrylate, 2.5% by weight acrylic acid, 0.5% by weight photoinitiator Initiator solution: 3.84 g tert-butyl perpivalate (75% strength in mineral oil) and 56.7 g MEK Example 3

A polymerization apparatus consisting of glass reactor, feed vessels, reflux condenser, stirrer, and nitrogen inlet was charged with 283 g of methyl ethyl ketone (MEK) under a gentle stream of nitrogen, and this initial charge was heated to 80° C. Added to it were 120 g of monomer mixture and 5.99 g of initiator solution, and polymerization was carried out at this temperature for 10 minutes. Then 1086 g of monomer mixture were added over the course of 3 hours and 53.9 g of initiator solution. Subsequently a solution of 23.2 g of tert-butyl perpivalate (75% strength in mineral oil) in 37.3 g of MEK was added over the course of 5 minutes, the temperature was raised to 85° C., and polymerization was continued for 60 minutes. The solvent was distilled off under reduced pressure, during which the temperature was raised to 135° C. At the end, under the best reduced pressure, degassing was carried out at 135° C. for an additional 1 hour and the polymer was aerated and discharged.

Solids content: 100%; K value: 51.9; zero-shear viscosity at 130° C.: 64.8 Pa·s

Monomer mixture: 88.2% by weight ethylhexyl acrylate, 9% by weight methyl methacrylate, 2.5% by weight acrylic acid, 0.3% by weight photoinitiator Initiator solution: 3.24 g tert-butyl perpivalate (75% strength in mineral oil) and 56.7 g MEK Example 4

A polymerization apparatus consisting of glass reactor, feed vessels, reflux condenser, stirrer, and nitrogen inlet was charged with 148 g of methyl ethyl ketone (MEK) under a gentle stream of nitrogen, and this initial charge was heated to 80° C. Added to it were 121 g of monomer mixture and 5.99 g of initiator solution, and polymerization was carried out at this temperature for 10 minutes. Then 1090 g of monomer mixture and 53.9 g of initiator solution were added over the course of 3 hours. Subsequently a solution of 3.2 g of tert-butyl perpivalate (75% strength in mineral oil) in 37.3 g of MEK was added over the course of 5 minutes, the temperature was raised to 85° C., and polymerization was continued for 60 minutes. The solvent was distilled off under reduced pressure, during which the temperature was raised to 135° C. At the end, under the best reduced pressure, degassing was carried out at 135° C. for an additional 1 hour and the polymer was aerated and discharged.

Solids content: 100%; K value: 53; zero-shear viscosity at 130° C.: 46.7 P·s

Monomer mixture: 97% by weight ethylhexyl acrylate, 2.5% by weight acrylic acid, 0.5% by weight photoinitiator Initiator solution: 3.2 g tert-butyl perpivalate (75% strength in mineral oil) and 56.7 g MEK Example 5

A polymerization apparatus consisting of glass reactor, feed vessels, reflux condenser, stirrer, and nitrogen inlet was charged with 283 g of methyl ethyl ketone (MEK) under a gentle stream of nitrogen, and this initial charge was heated to 80° C. Added to it were 121.1 g of monomer mixture and 5.99 g of initiator solution, and polymerization was carried out at this temperature for 10 minutes. Then 1090.3 g of monomer mixture and 53.9 g of initiator solution were added over the course of 3 hours. Subsequently a solution of 3.2 g of tert-butyl perpivalate (75% strength in mineral oil) in 37.3 g of MEK was added over the course of 5 minutes, the temperature was raised to 85° C., and polymerization was continued for 60 minutes. The solvent was distilled off under reduced pressure, during which the temperature was raised to 135° C. At the end, under the best reduced pressure, degassing was carried out at 135° C. for an additional 1 hour and the polymer was aerated and discharged.

Solids content: 100%; K value: 53; zero-shear viscosity at 130° C.: 69.1 P·s

Monomer mixture: 88% by weight ethylhexyl acrylate, 9% by weight methyl methacrylate, 2.5% by weight acrylic acid, 0.5% by weight photoinitiator Initiator solution: 3.2 g tert-butyl perpivalate (75% strength in mineral oil) and 56.7 g MEK Example 6

A polymerization apparatus consisting of glass reactor, feed vessels, reflux condenser, stirrer, and nitrogen inlet was charged with 283 g of methyl ethyl ketone (MEK) under a gentle stream of nitrogen, and this initial charge was heated to 80° C. Added to it were 121.1 g of monomer mixture and 5.9 g of initiator solution, and polymerization was carried out at this temperature for 10 minutes. Then 1090 g of monomer mixture and 53.3 g of initiator solution were added over the course of 3 hours. Subsequently a solution of 3.2 g of tert-butyl perpivalate (75% strength in mineral oil) in 37.3 g of MEK was added over the course of 5 minutes, the temperature was raised to 85° C., and polymerization was continued for 45 minutes. The solvent was distilled off under reduced pressure, during which the temperature was raised to 135° C. At the end, under the best reduced pressure, degassing was carried out at 135° C. for an additional 1 hour and the polymer was aerated and discharged.

Solids content: 100%; K value: 51.4; zero-shear viscosity at 130° C.: 49.8 P·s

Monomer mixture: 88% by weight ethylhexyl acrylate, 11.5% by weight methyl methacrylate, 0.5% by weight photoinitiator Initiator solution: 2.56 g tert-butyl perpivalate (75% strength in mineral oil) and 56.7 g MEK Performance Testing:

1a. Production of the Multilayer Film (General Procedure a):
A polyester film (film 1: PET) with a layer thickness of 36 μm was coated with the respective polymer at a temperature of 110° C., by means of a coating bar, in an amount of 17 g/m². The substrate thus coated was cooled and then irradiated with UV light from a medium-pressure mercury vapor lamp (maximum intensity at a wavelength of 250 to 260 nm) with the respective UV dose. Then the coated film was rolled with a sealing film (film 2: PE) 25 µm thick at 25° C. and laminated.

Film layer structure: PET backing/PSA layer/PE seal layer

1b. Production of the Multilayer Film (General Procedure b):

A polyester film (film 1: PET) with a layer thickness of 36 µm was coated with the respective polymer at a temperature of 110° C., by means of a coating bar, in an amount of 17 g/m². The substrate thus coated was cooled and then rolled on and laminated to a sealing film 25 µm thick (film 2: PE) at 25° C. The laminate was then irradiated with UV light from a medium-pressure mercury vapor lamp (maximum intensity at a wavelength of 250 to 260 nm) through the sealing layer with the respective UV dose.

Film layer structure: PET backing/PSA layer/PE seal layer

In accordance with production procedure 1a, multilayer films were produced using the polymers from Examples 1, 3, and 5. In accordance with production procedure 1b, a multilayer film was produced using the polymer from Example 6.

2. Sealing:

The multilayer film described was sealed with the PE side of a PET/PE composite film (film 3: thickness 300 µm). The multilayer film and film 3 were for this purpose pressed together for 1.5 seconds at 3 bar and 145° C. (heating from side of film 1). The sealed assembly obtained had a width of approximately 10 mm.

In deviation from this procedure, for Example 6, the sealing was carried out as follows: the multilayer film was sealed with the PE side of a PET/PE composite film (film 3: thickness 65 µm). The multilayer film and film 3 were for this purpose pressed together for 3 seconds at 3 bar and 180° C. (heating from side of film 1). The sealed assembly obtained had a width of approximately 10 mm.

Composite Layer Structure:

PET backing/PSA layer/PE seal layer/PE/PET

3. Testing of the Composite:

The sealed composite produced was subjected to a separation test in a method based on Finat # 1. Film 3 and the multilayer film were separated a number of times at a constant peel rate of 300 mm/min and at an angle of 180°. After each separation, film 3 was rebonded to the multilayer film by means of a rolling device (weight 2 kg, speed 100 mm/sec).

The results are compiled in the tables below. In these tables, C stands for cohesive fracture into the adhesive layer, and A or A2 stands for adhesive fracture between the adhesive and the PET film.

Polymer from Example 1, irradiated with 5 mJ/cm²
Irradiation before the lamination with PE sealing film

| Number of separations performed | Average force [N/10 mm] | Maximum force [N/10 mm] | Fracture mode |
|---|---|---|---|
| 1 | 7.9 | 11.2 | C |
| 2 | 2.6 | 3.5 | C |
| 3 | 2.7 | 3.8 | C |
| 4 | 2.2 | 3.3 | C |
| 5 | 2.2 | 3.4 | C |
| 6 | 1.7 | 3.0 | C |

-continued

Polymer from Example 1, irradiated with 5 mJ/cm²
Irradiation before the lamination with PE sealing film

| Number of separations performed | Average force [N/10 mm] | Maximum force [N/10 mm] | Fracture mode |
|---|---|---|---|
| 7 | 1.6 | 2.7 | C |
| 8 | 1.2 | 2.3 | C |
| 9 | 1.1 | 2.0 | C |
| 10 | 0.9 | 1.6 | C |

Polymer from Example 3, irradiated with 5 mJ/cm²
Irradiation before the lamination with PE sealing film

| Number of separations performed | Average force [N/10 mm] | Maximum force [N/10 mm] | Fracture mode |
|---|---|---|---|
| 1 | 3.1 | 3.3 | A2 |
| 2 | 0.9 | 1.2 | A2 |
| 3 | 0.8 | 1.0 | A2 |
| 4 | 0.9 | 1.0 | A2 |
| 5 | 0.9 | 1.0 | A2 |
| 6 | 0.8 | 0.9 | A2 |
| 7 | 0.8 | 0.9 | A2 |
| 8 | 0.8 | 0.9 | A2 |
| 9 | 0.8 | 0.9 | A2 |
| 10 | 0.8 | 0.9 | A2 |

Polymer from Example 5, irradiated with 5 mJ/cm²
Irradiation before the lamination with PE sealing film

| Number of separations performed | Average force [N/10 mm] | Maximum force [N/10 mm] | Fracture mode |
|---|---|---|---|
| 1 | 3.2 | 3.7 | A2 |
| 2 | 0.8 | 1.5 | A2 |
| 3 | 0.6 | 1.1 | A2 |
| 4 | 0.6 | 1.1 | A2 |
| 5 | 0.7 | 1.2 | A2 |
| 6 | 0.7 | 1.2 | A2 |
| 7 | 0.7 | 1.2 | A2 |
| 8 | 0.7 | 1.1 | A2 |
| 9 | 0.6 | 1.1 | A2 |
| 10 | 0.6 | 1.1 | A2 |

Polymer from Example 6, irradiated with 10 mJ/cm²;
Irradiation after the lamination with PE sealing film, through the PE sealing film

| Number of separations performed | Average force [N/10 mm] | Maximum force [N/10 mm] |
|---|---|---|
| 1 | 2.7 | 3.5 |
| 2 | 0.5 | 0.8 |
| 3 | 0.5 | 0.7 |
| 4 | 0.4 | 0.7 |
| 5 | 0.4 | 0.8 |
| 6 | 0.4 | 0.6 |
| 7 | 0.4 | 0.7 |
| 8 | 0.4 | 0.7 |
| 9 | 0.4 | 0.5 |
| 10 | 0.4 | 0.7 |

The invention claimed is:

1. A reclosable pack, comprising:
   at least one multilayer film comprising:
   a) a backing film selected from the group consisting of a transparent polymer film and a metallized polymer film,
   b) a layer of pressure-sensitive adhesive formed from an acrylate polymer having a glass transition temperature<−20° C., determined according to ASTM-D 3418/82, comprising 1 to 30 mmol of a copolymerized photoinitiator per kg of acrylate polymer, the acrylate polymer comprising, in reacted form, monoethylenically unsaturated monomers M and the copolymerized photoinitiator, the monomers M comprising:
   b1) at least 80% by weight, based on the total weight of the acrylate polymer, of at least one monomer A selected from the group consisting of $C_3$-$C_{20}$ alkyl acrylates;
   b2) 1 to 20% by weight of at least one monomer B selected from the group consisting of $C_1$-$C_4$ alkyl methacrylates, methyl acrylate, and ethyl acrylate;
   b3) up to 10% by weight of at least one nonaromatic, monoethylenically unsaturated monomer C, which is selected from the group consisting of monoethylenically unsaturated $C_3$-$C_8$ monocarboxylic acids, amides of monoethylenically unsaturated $C_3$-$C_8$ monocarboxylic acids, monoethylenically unsaturated $C_4$-$C_8$ dicarboxylic acids, mono-$C_1$-$C_{20}$ alkyl esters of monoethylenically unsaturated $C_4$-$C_8$ dicarboxylic acids, and hydroxyalkyl esters of monoethylenically unsaturated $C_3$-$C_8$ monocarboxylic acids,
   wherein weight fractions of monomers A, B and C add up to 100% by weight, and the acrylate polymer is crosslinked by UV radiation,
   wherein the photoinitiator has the formula (I):

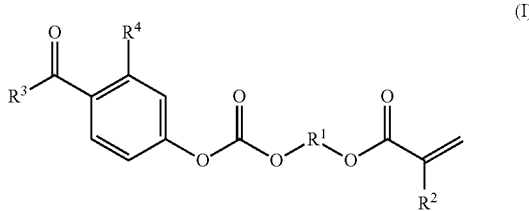

wherein $R^1$ is a divalent organic radical having 2-30 carbon atoms, $R^2$ is H or a $C_1$-$C_4$ alkyl group and $R^3$ is H or a $C_1$-$C_4$ alkyl group, and
   c) a sealable layer,
   wherein the layer of pressure-sensitive adhesive is disposed between the backing film and the sealable layer.

2. The reclosable pack according to claim 1, wherein the backing film is a polyolefin film or polyester film.

3. The reclosable pack according to claim 1, wherein the backing film is a polyethylene terephthalate film.

4. The reclosable pack according to claim 1, wherein the sealable layer comprises polyethylene.

5. The reclosable pack according to claim 1, wherein the layer of pressure-sensitive adhesive has an average coating thickness of 1 to 50 g/m².

6. The reclosable pack according to claim 1, comprising two packaging elements connected to one another via the sealable layer, one of the packaging elements being the multilayer film comprising:
   a) the backing film which is a polyolefin film or a polyester film.

7. The reclosable pack according to claim 1, wherein the multilayer film is in the form of a closure film.

8. The reclosable pack according to claim 1, wherein the multilayer film is in the form of a container molding.

9. The reclosable pack according to claim 1, wherein the sealable layer consists of polyethylene.

10. The reclosable pack according to claim 6, wherein the multilayer film is in the form of a closure film.

11. The reclosable pack according to claim 6, wherein the multilayer film is in the form of a container molding.

12. The reclosable pack of claim 1 which is in the form of a resealable packaging in which the layer of the pressure-sensitive adhesive is separable from the sealable layer such that after 10 opening/closing events the bond strength between the layer of the pressure-sensitive adhesive and the sealable layer according to Finat # 1 is at least 0.5 N/10 mm.

13. The reclosable pack of claim 1, which is operable by cohesive fracture of the layer of the pressure-sensitive adhesive when first opened.

14. The reclosable pack according to claim 1, wherein formula (I) $R^1$ is butane-1,4-diyl, $R^2$ is a hydrogen atom, and $R^3$ is a phenyl group.

15. The reclosable pack according to claim 1, wherein the acrylate polymer comprises no polyethylenically unsaturated monomer.

16. The reclosable pack according to claim 1, wherein the acrylate polymer consists of monomers A, B, C and the photoinitiator.

17. The reclosable pack according to claim 1, wherein the backing film is a transparent polyethylene terephthalate polymer, the acrylate polymer consists of ethylhexyl acrylate, methyl methacrylate, acrylic acid and the photoinitiator, and the sealable layer is a polyethylene polymer.

18. The reclosable pack according to claim 1, further comprising a polyethylene layer directly adjacent to the sealable layer and a polyethylene terephthalate layer directly adjacent to the polyethylene layer.

19. The reclosable pack according to claim 1, wherein $R^1$ is a divalent organic radical having 4-30 carbon atoms.

* * * * *